UNITED STATES PATENT OFFICE.

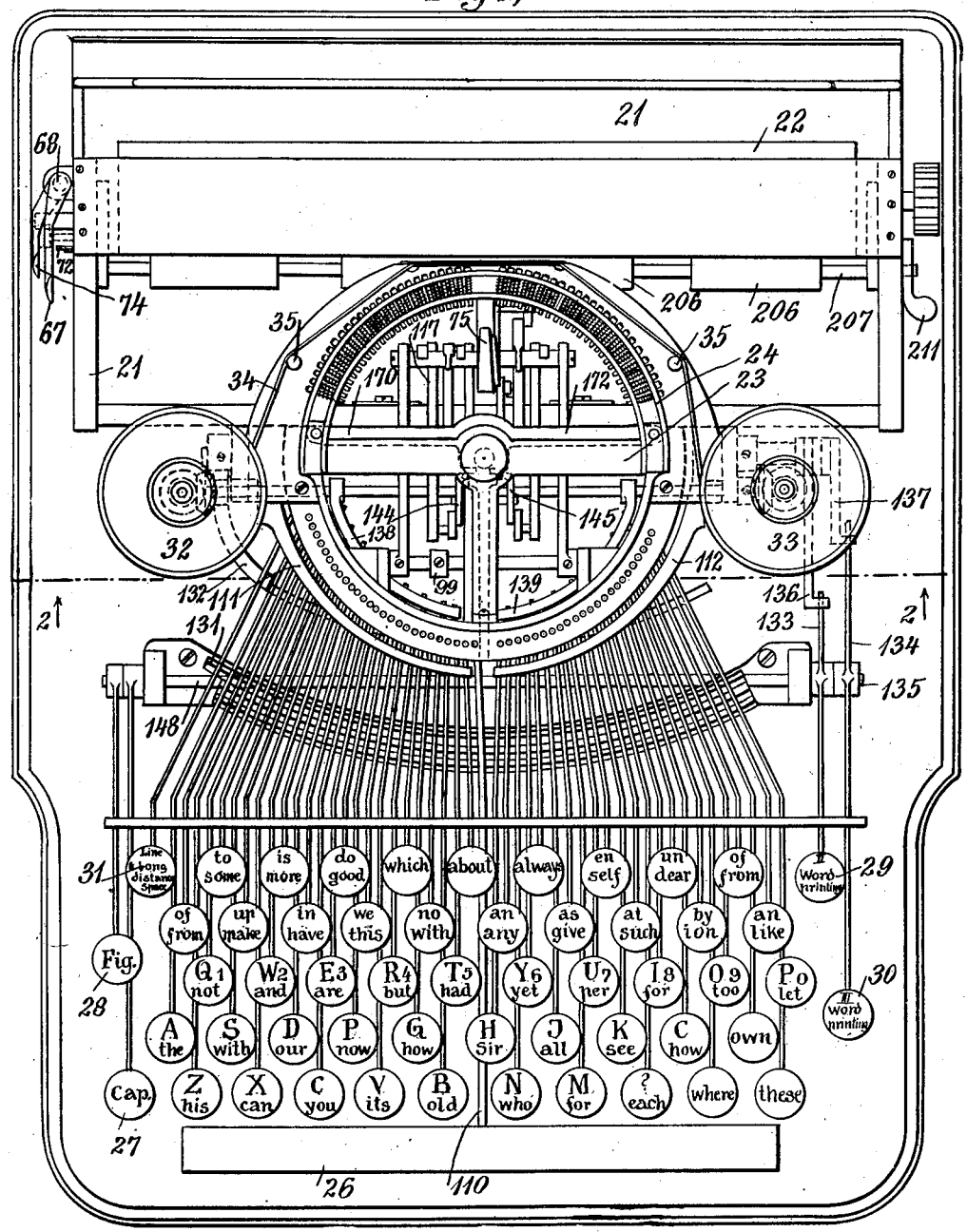

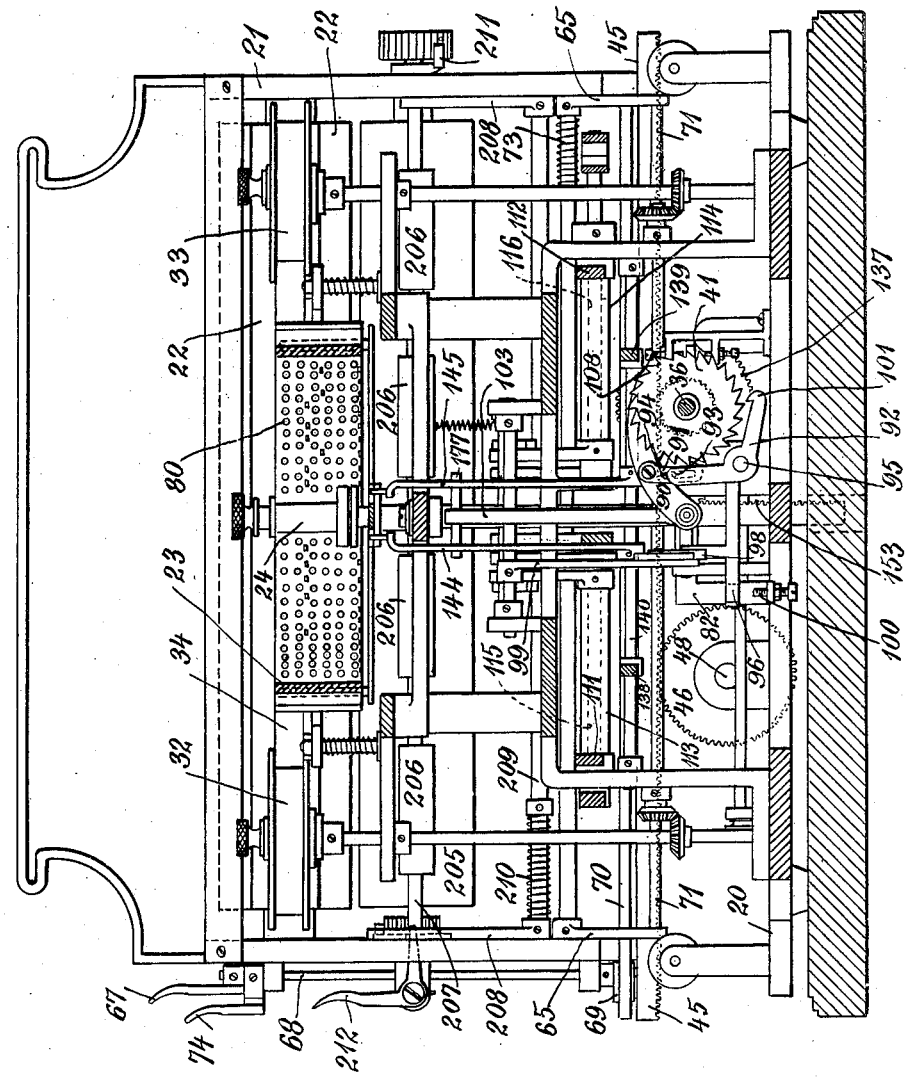

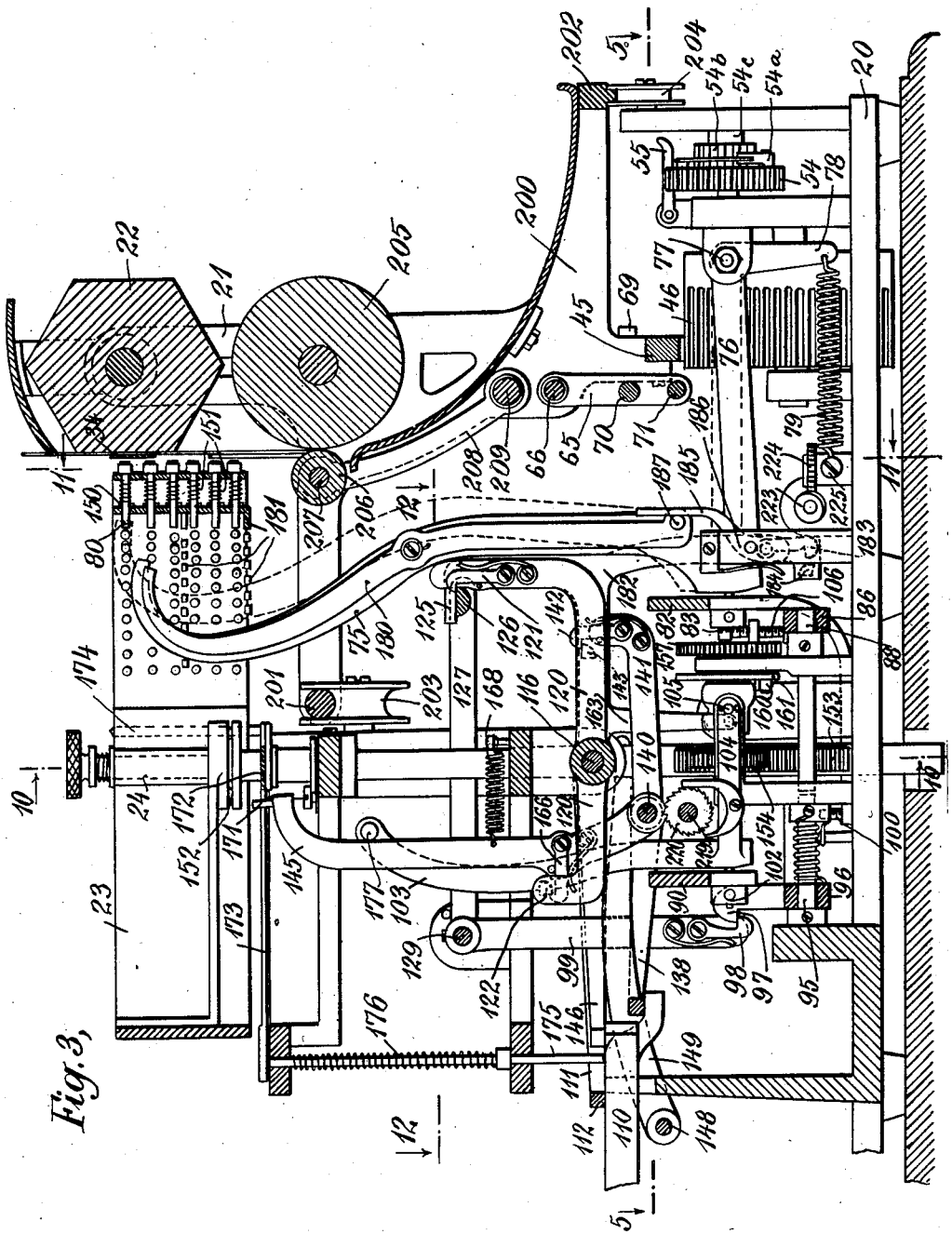

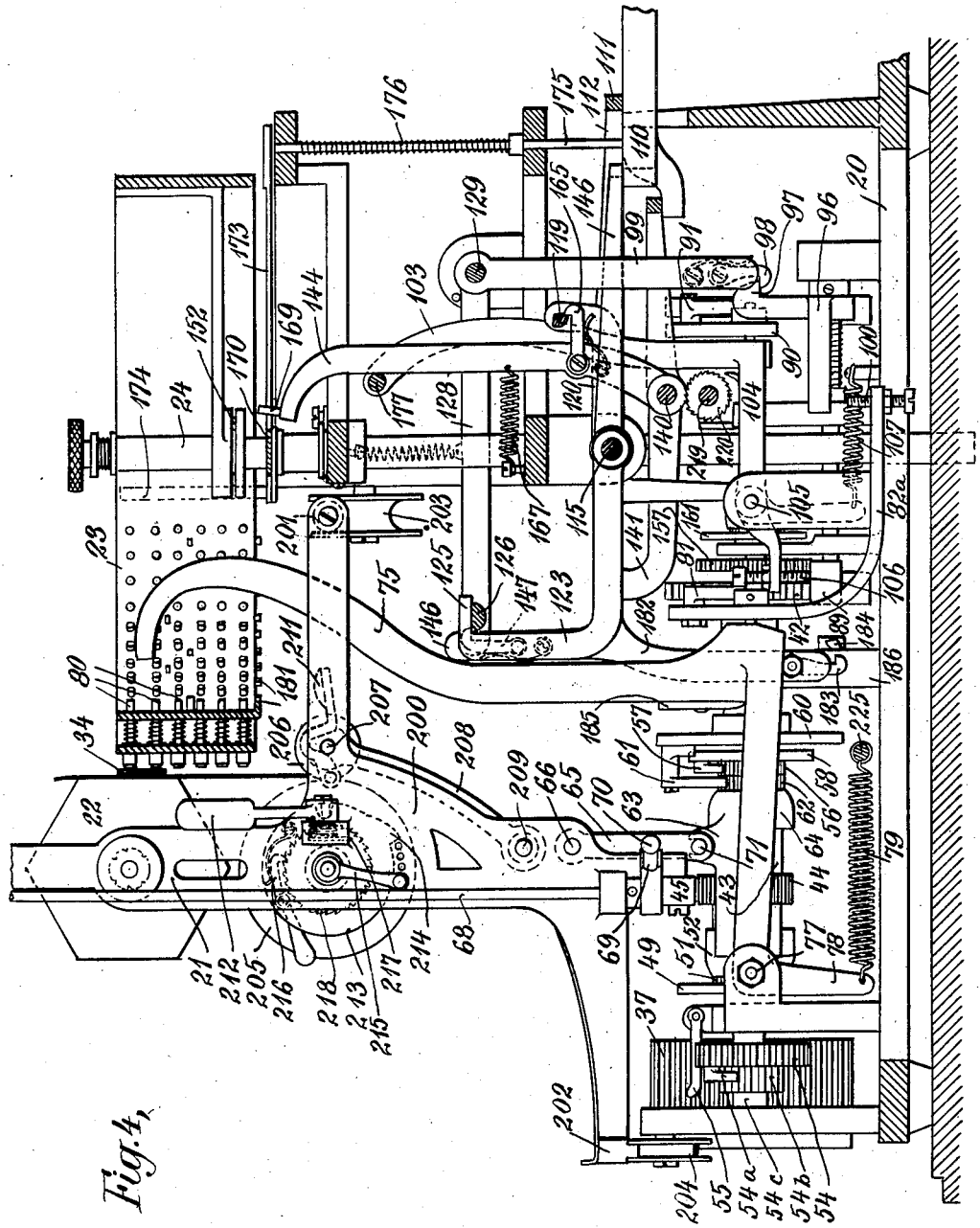

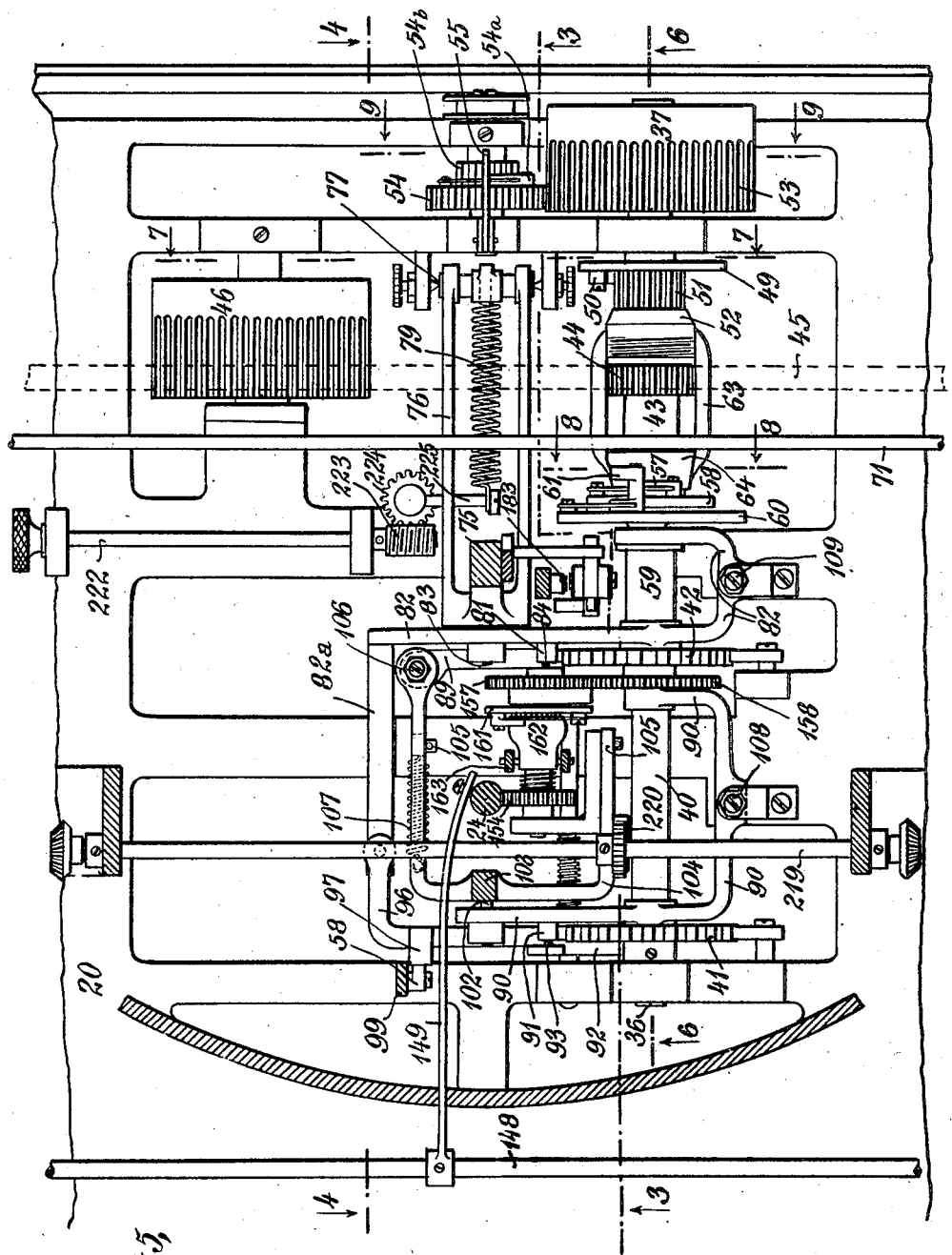

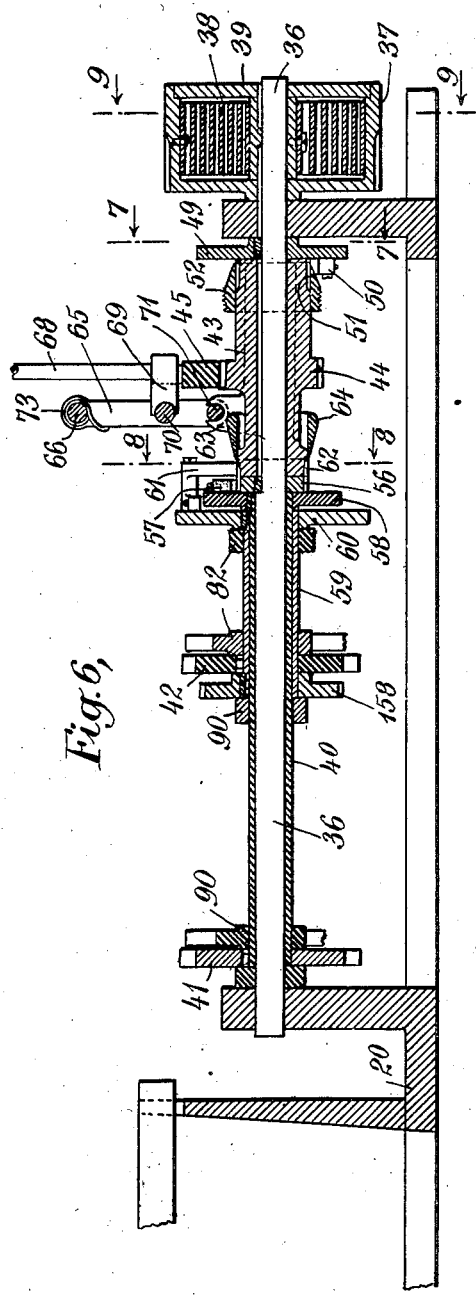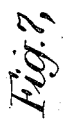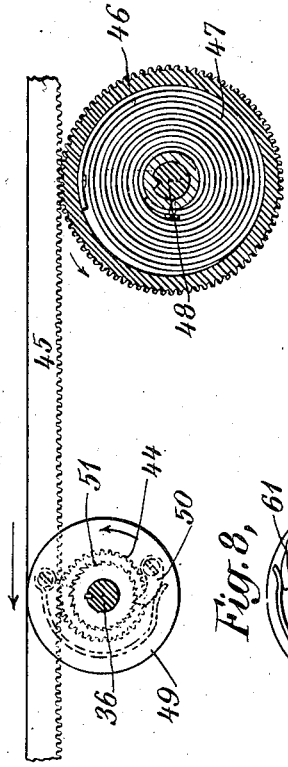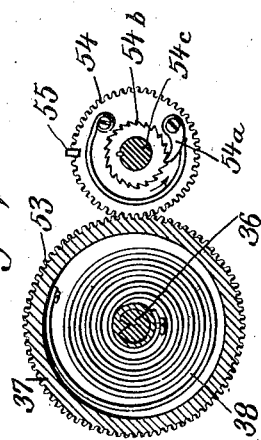

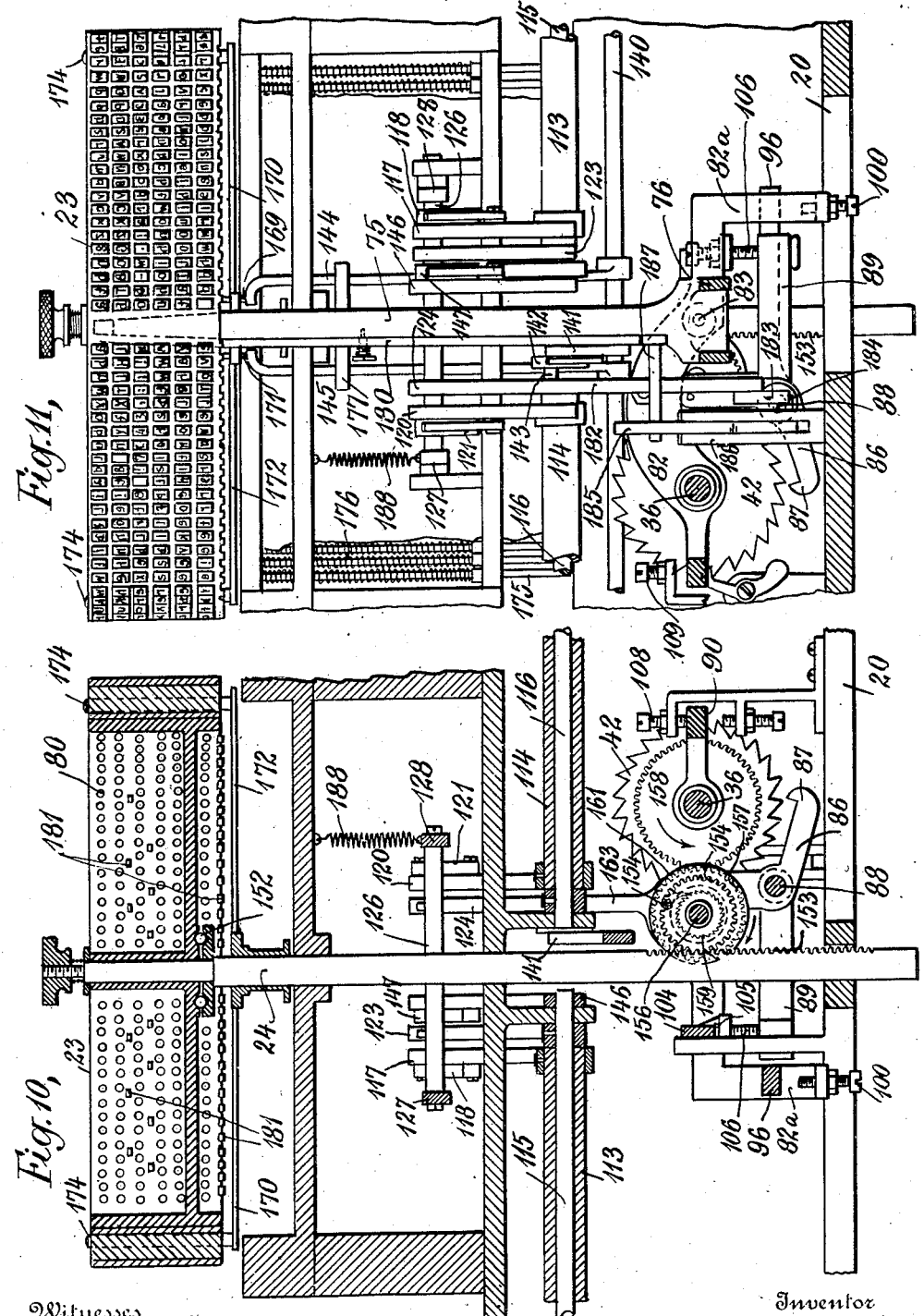

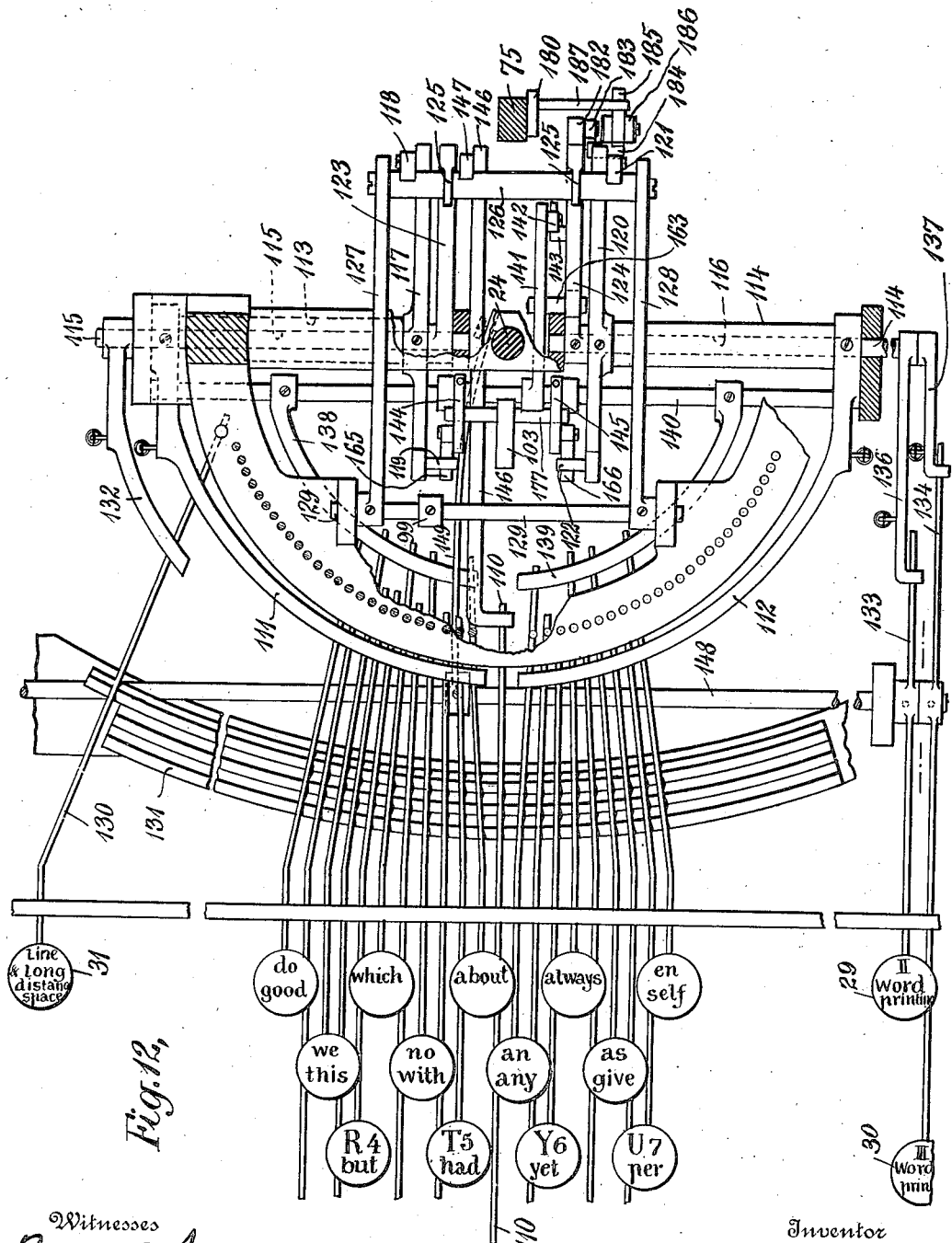

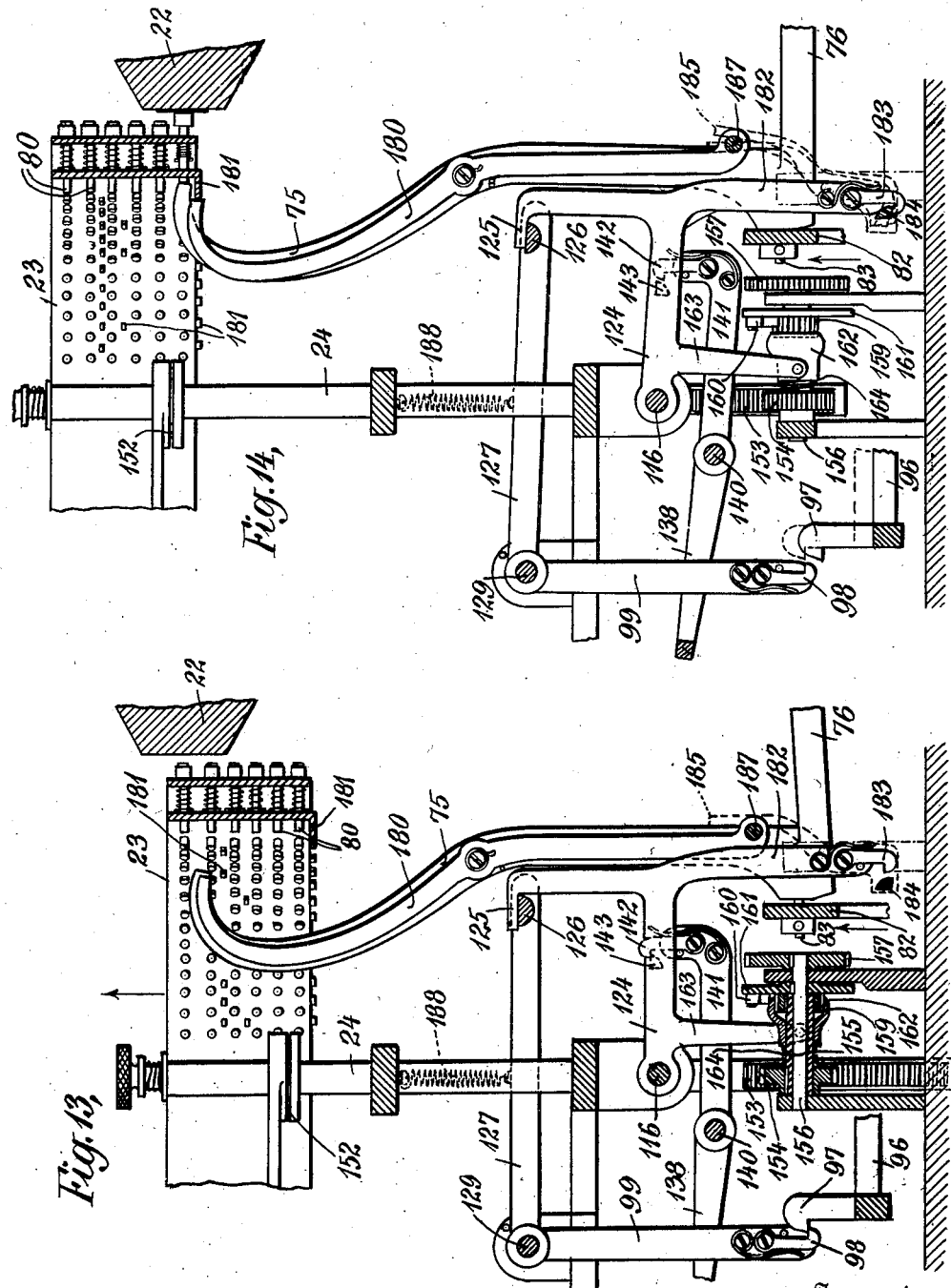

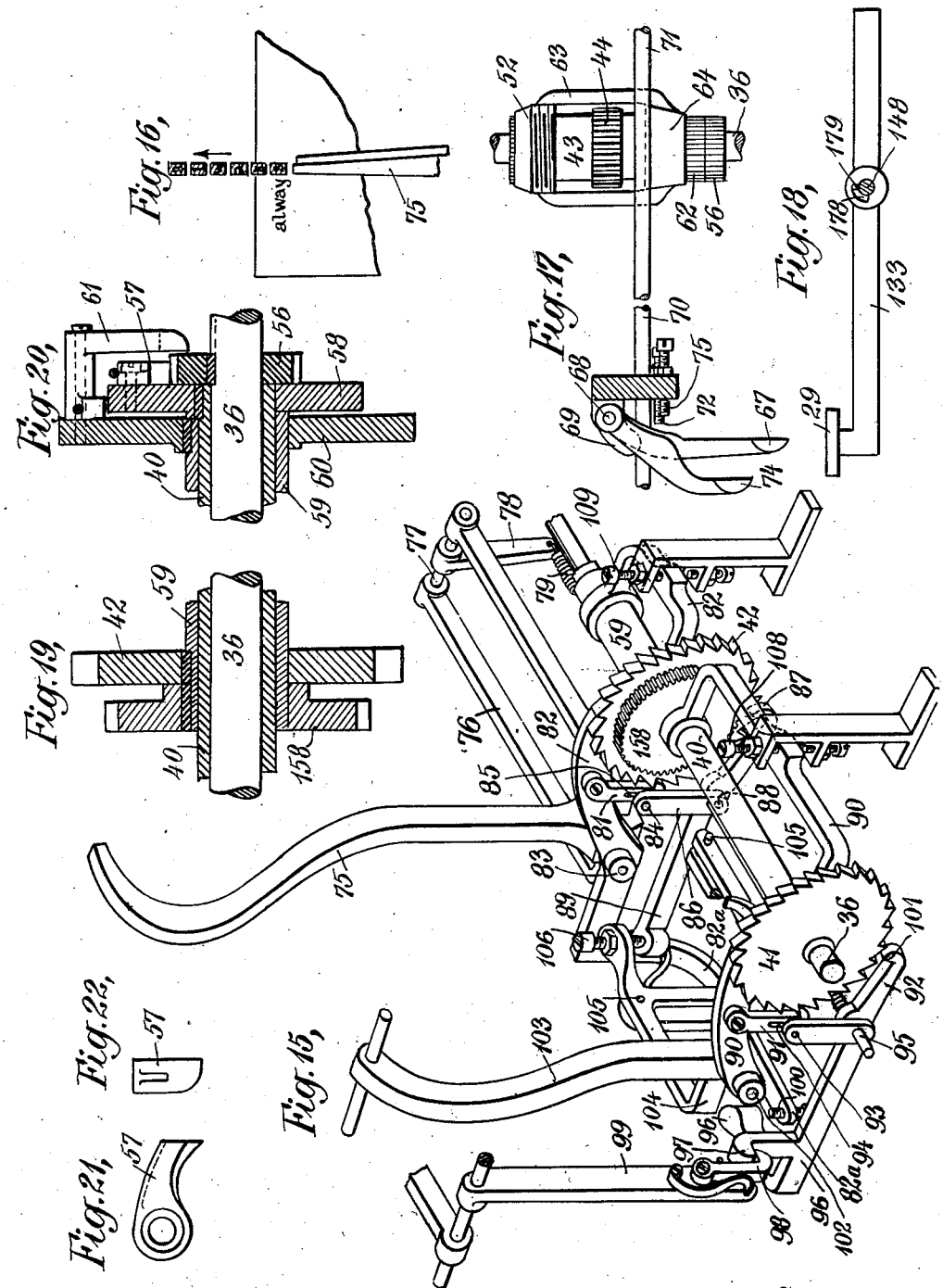

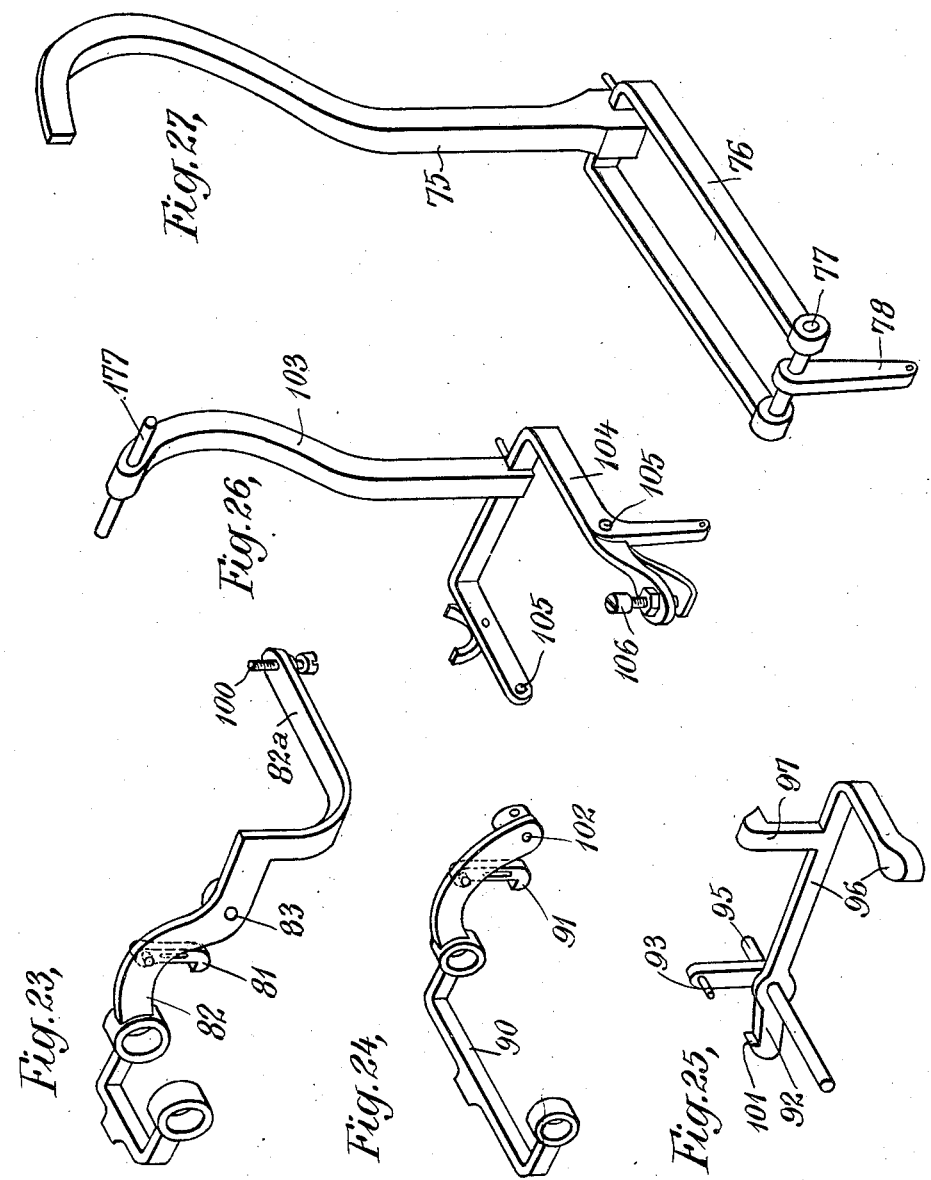

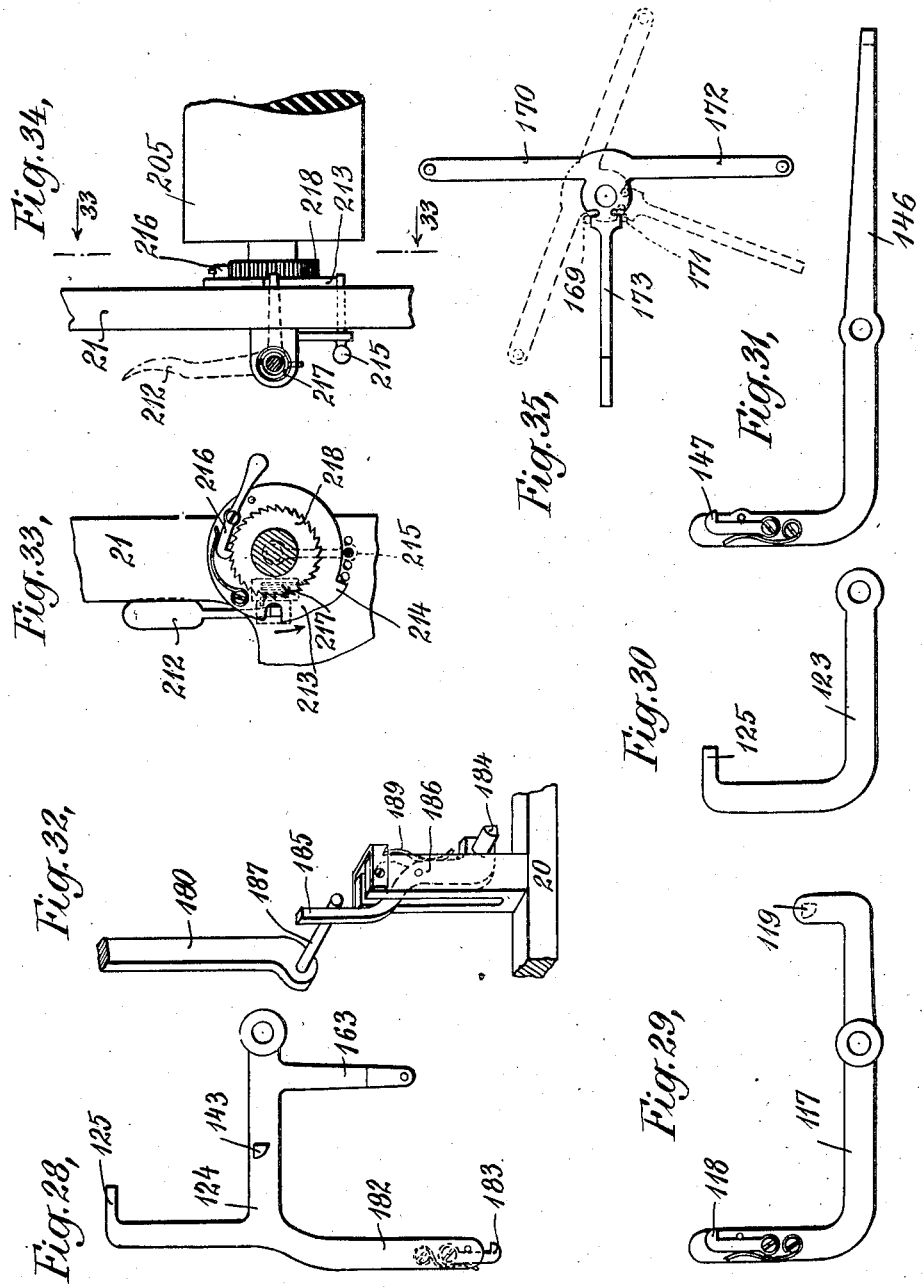

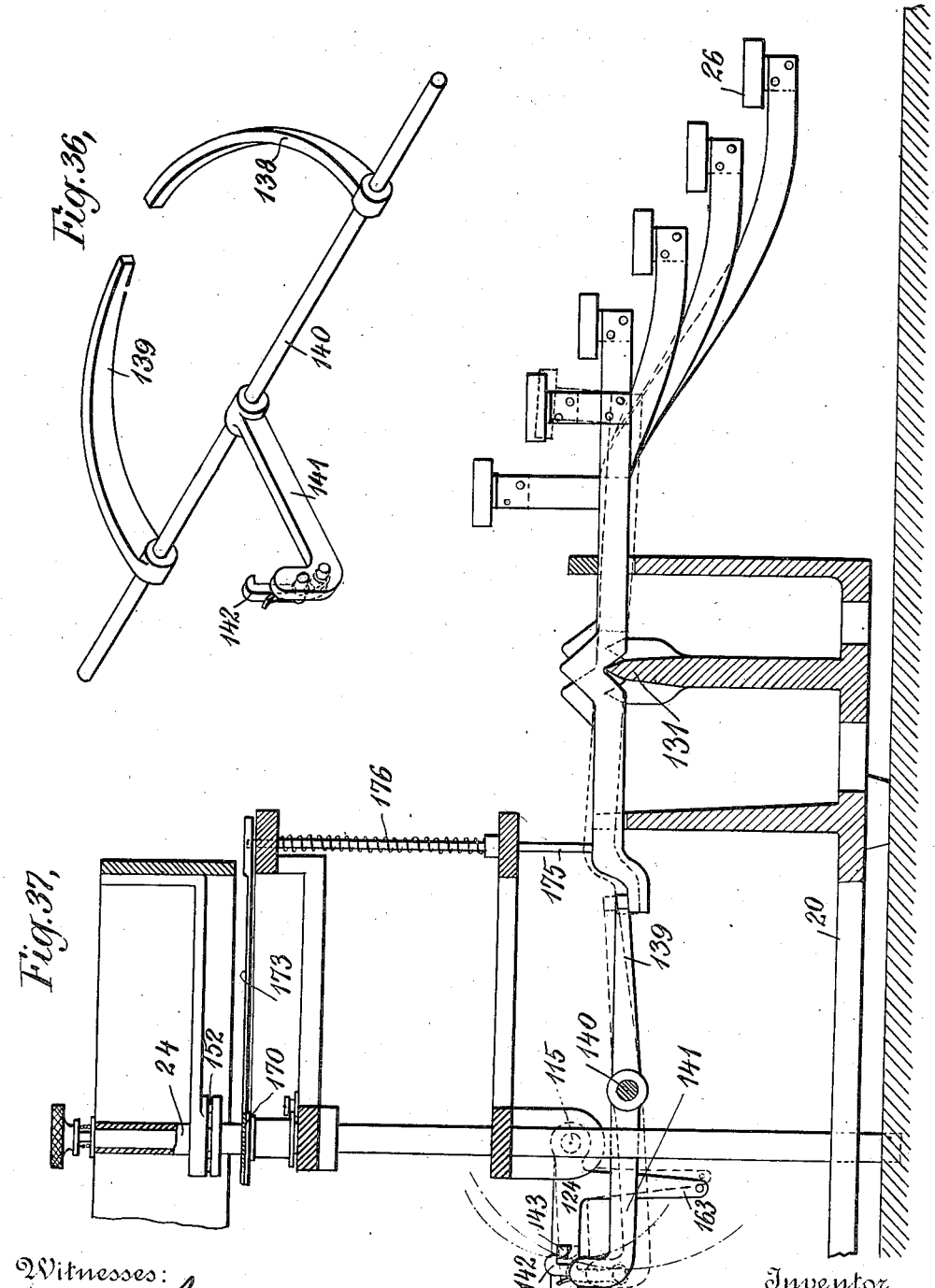

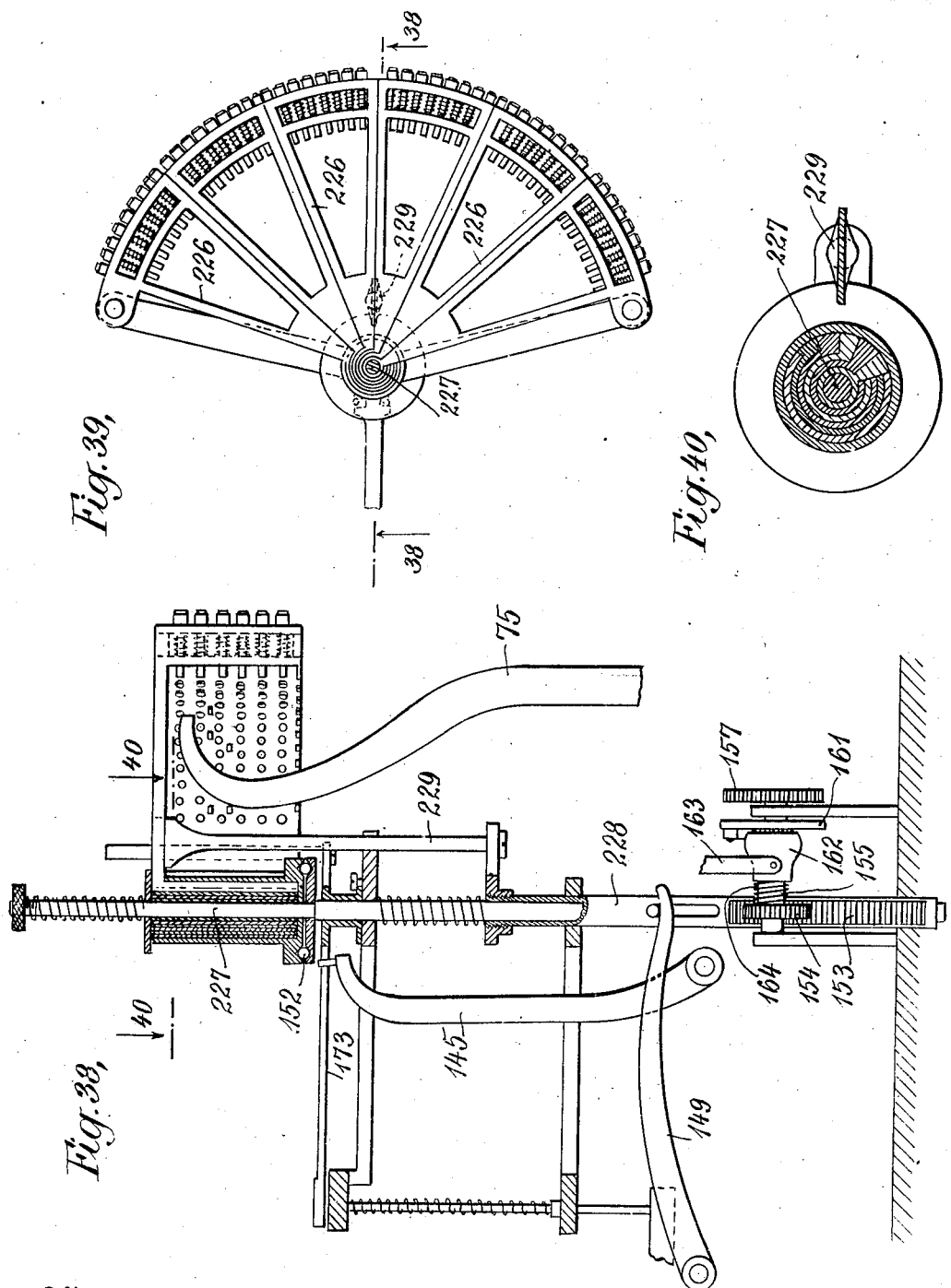

LEON HAUERSTEIN, OF JERSEY CITY, NEW JERSEY.

TYPE-WRITER.

942,825.

Specification of Letters Patent. Patented Dec. 7, 1909.

Application filed February 20, 1909. Serial No. 479,153.

*To all whom it may concern:*

Be it known that I, LEON HAUERSTEIN, a citizen of the Empire of Germany, and a resident of Jersey City, Hudson county, and State of New Jersey, have invented certain new and useful Improvements in Type-Writers, of which the following is a specification.

My invention relates generally to typewriting machines, and particularly to machines designed to print entire words at a single operation.

The machine herein described comprises means for printing a large number of short words which are very frequently used, at a single operation, and also comprises means for printing letters and other characters separately, so that other words may be spelled out as usual.

In the particular embodiments of my invention illustrated in the accompanying drawings, the printing is done by means of type-faced plungers or pins carried by a type cylinder, or by segments of a cylinder, mounted for both axial and rotary movement. The paper or record sheet is carried on a suitable platen mounted upon a movable carriage substantially the same as is common in typewriters, although the platen is of different construction from ordinary platens, as will be pointed out hereinafter. Between the type cylinder and this platen there is an inking ribbon; and there is a hammer arranged to drive the type against this ribbon and so to strike an impression upon the paper or record strip passing over the platen.

The machine also comprises finger keys and key levers and mechanism operated by these keys for rotating the type cylinder as required, and for raising and lowering said cylinder to bring different rows of type into action and for releasing the hammer above mentioned. The actual work of operating the hammer is done by a spring, wound during the return of the carriage as hereinafter described, and the transmission of power from the spring to the hammer is controlled by suitable escapement mechanism operated by the character keys.

The type cylinder is not provided merely with one set of alphabet keys and a few punctuation keys, together with shift keys by means of which upper case letters, numerals, etc., may be printed, but is provided as well with other shift keys by the operation of one of which these same keys may be used for printing words; and the machine is further provided with a plurality of rows of special word-printing keys, in connection with which the other word-shift key is intended to be used. The principle of the machine is such that there may be more or less rows of keys, as desired. In the machine shown, words of six letters are the longest which can be printed by the depression of a single key, the type wheel having only six horizontal rows of type; but obviously the type wheel might have more rows of type, in which cases words having a greater number of letters might be printed. In automatic word printing, *i. e.*, in printing a complete word or several characters by the actuation of one of the word keys of the keyboard, the type wheel is rotated by the depression of the appropriate word key, so as to bring the first letter of that word opposite the hammer, and this hammer is released automatically, so printing the first letter of the word, is then drawn back, the type wheel caused to rise one row automatically (so bringing the second letter of the word opposite the hammer) and said hammer is again released automatically, and so on until all of the letters of the word have been printed with one depression of the word key. It will be understood that the letters of each word, for which there is a corresponding key, are arranged in vertical rows on the type wheel, so that the type wheel having once been rotated to the proper position and moved axially, if necessary, to bring the first letter of the word opposite the hammer, the various letters of the word may be printed in order by successive operations of the hammer, the type wheel rising one space after each such operation of the hammer. Some keys correspond to two short words, or to one or more characters and a word. When one of such keys is depressed, the character or word, or (in the case of keys corresponding to two words) one word or the other is printed, according to whether a corresponding shift key has been depressed or not.

In the said drawings: Figure 1 is a top view of the complete machine, showing a convenient arrangement of keys in the keyboard of the machine. Fig. 2 is a vertical sectional elevation looking from the front, the section being taken on the line 2—2 of Fig. 1. Fig. 3 shows a vertical longitudinal section of the machine, that is, a section from front to rear, taken on the irregular line 3—3 of Fig. 5, looking toward the left side of the machine. Fig. 4 shows a vertical longitudinal section of the machine, taken on the line 4—4 of Fig. 5, looking toward the right side of the machine. Fig. 5 shows a horizontal section of the machine, taken on the line 5—5 of Fig. 3. Fig. 6 shows a detail longitudinal section of a portion of the escapement mechanism, the section being taken on the line 6—6 of Fig. 5. Fig. 7 shows a detail elevation of the carriage rack-bar and the parts with which said rack-bar directly coacts, shaft 36 being sectioned on the line 7—7 of Fig. 6, and spring-drum 46 being also shown in section. Fig. 8 shows a detail section of a portion of the escapement mechanism, the view being a sectional elevation, taken on the line 8—8 of Fig. 6. Fig. 9 shows a detail section of spring-drum 37 and a detail elevation of other associated parts. Fig. 10 shows a transverse vertical section of the typewheel and associated parts of the machine, the section being taken on the line 10—10 of Fig. 3. Fig. 11 shows a rear elevation of the typewheel and of parts of the escapement mechanism, the view being a vertical section on the line 11—11 of Fig. 3. Fig. 12 is a detail top view of a portion of the keyboard, and of the mechanism actuated thereby for setting the escapement mechanism into operation and for causing and limiting the rotation of the typewheel; the view being a top view on the line 12—12 of Fig. 3. Fig. 13 is a detail elevation and partial section of the mechanism for raising the typewheel step by step, in word printing, and also shows parts of the mechanism for setting the escapement mechanism in operation. Fig. 14 is a view similar to Fig. 13, but showing the typewheel elevated to bring the lowermost row of type into printing position. Fig. 15 shows a detail isometric perspective view of the principal portion of the escapement mechanism. Fig. 16 is a diagrammatic view illustrating the method of printing words automatically. Fig. 17 is a detail top view of the levers for releasing the escapement pawls when returning or releasing the carriage, and also shows associated parts. Fig. 18 is a detail side view of one of the shift levers of the keyboard. Fig. 19 is a detail section of gears 42 and 158 of the escapement mechanism, and also shows associated parts. Fig. 20 is a detail sectional view of parts 58, 60 and 56 of the escapement mechanism, and associated parts. Fig. 21 is a side view, and Fig. 22 an end view, of the pawl 57, showing the shape thereof, whereby said pawl may be lifted by the cone pawl-lifter 64, said views being also illustrative of the construction of pawls 50 and 160. Figs. 23-32 are detail elevations of certain portions of the escapement mechanism, certain of these views being perspective views. Fig. 33 shows an end elevation, and Fig. 34 a front elevation, of the line spacing mechanism. Fig. 35 is a detail view of the parts by which the typewheel is rotated. Fig. 36 is a detail perspective elevation of the levers 138 and 139 (the curved levers actuated by the two upper rows of keys), and also shows the shaft 140 on which these levers are mounted, the lever 141, and pawl 142. Fig. 37 is a detail sectional elevation of parts of the machine, showing the parts which are directly actuated by the two upper rows of keys, and also showing the means whereby the typewheel is arrested in a position corresponding to the character to be printed. Figs. 38, 39 and 40 are views illustrative of the use of a composite typewheel composed of a plurality of separate segments arranged to be rotated *en masse*, but to be elevated separately, so reducing the word required to be done in automatic word-printing. Fig. 38 shows a detail sectional elevation, Fig. 39 a top view, and Fig. 40 a horizontal section through the central portion of the composite typewheel on the line 40—40 of Fig. 38.

Referring first to the general views of the machine, Figs. 1-5 inclusive, 20 designates the base of the machine, 21 the carriage thereof, 22 the platen, 23 the type-wheel or type-cylinder, 24 the spindle by which said type cylinder is mounted to move vertically or axially and on which it rotates as required to bring different type, or rows of type, into printing position, and 25 designates the keyboard generally. In Fig. 1 I have indicated on the various keys of this keyboard various letters, numerals, punctuation marks, words, etc., and hence it is unnecessary to apply special reference characters to these different keys. The keyboard comprises the usual space key 26, an upper case shift key 27, a numeral shift key 28, two word-printing shift keys, 29 and 30, and a long-distance-space key, and line-drawing key, 31. The mechanism by which these keys effect control of the different parts of the machine will be illustrated and described hereinafter. 32 and 33 designate the customary ribbon reels for holding an inking ribbon, and 34 designates the said inking ribbon and 35 suitable guides therefor. I have illustrated, and will describe hereinafter, suitable ribbon feed mechanism, but do not intend thereby to limit myself to the use of any particular ribbon feed mechanism. When one of the letter-keys or word-keys is depressed, the typewheel is caused to rotate until the corresponding type of the typewheel is opposite the hammer; the typewheel being arrested in this position by engagement of an arm rotating with the typewheel, with a stop raised by the key-lever actuated. At the same time, mechanism actuated by the depression of this key-lever engages and depresses an operating bar of escapement mechanism, by which the hammer is first released and caused to operate, and is then drawn back, the carriage being caused to move onward one space. According to circumstances, the escapement mechanism will cease to operate after completing one cycle of operations, or will continue to operate for a certain number of times and then stop. The escapement mechanism is double, comprising two separate escapements and two driving springs; one escapement serving to operate the hammer, the other to operate a restoring arm for type-wheel rotating means and also to control the feed of the carriage.

*Escapement mechanism.* (Figs. 4-12 incl., 15, 19-27 incl.)—36 (see particularly Figs. 6 and 15) designates a power shaft mounted to rotate, and having upon it a spring casing 37 within which is a spiral spring 38, the outer end of said spring being connected to the spring casing, the inner end to the hub of a disk 39 forming the end plate of the spring casing and having a key-connection to shaft 36. On this shaft 36 is mounted a sleeve 40, which forms, in effect, another power shaft, which is practically a continuation of shaft 36, and has keyed to it an escapement ratchet-wheel 41 which, with another escapement ratchet-wheel 42, on sleeve 59, hereinafter mentioned, form the escapement wheels of the coöperating escapements above mentioned. Another sleeve, 43, likewise mounted on shaft 36, and forming, in effect, a third power shaft, driven by spring 47 hereinafter mentioned, is provided with a toothed pinion 44 arranged to mesh with a rack bar 45 secured to the platen-carriage and movable therewith. A second spring case, 46, (Figs. 5 and 7), has on its periphery gear teeth which mesh with the teeth of said rack 45; and within this second spring case is a spiral spring 47, secured at its outer end to said spring case and secured at its inner end to the stationary spindle 48. As will be seen, the arrangement is such that spring 38 drives shaft 36, (and through it sleeve 40, as will be seen hereafter,) and spring 47 drives rack-bar 45 and sleeve 43. Suitable ratchet mechanism, presently described, normally connects shaft 36 and sleeve 40 (and therefore escapement wheel 41), and like ratchet mechanism normally connects sleeve 43 and sleeve 59 to which escapement wheel 42 is keyed; this sleeve 59 constituting in effect a fourth power shaft, which practically is a continuation of sleeve 43. Other ratchet mechanism is provided, whereby the return of the carriage (*i. e.*, of rack-bar 45) winds spring 38. Such ratchet mechanism comprises a disk 49 keyed to shaft 36, a pawl 50 carried by this disk and adapted to engage the teeth of a gear 51 formed integrally with sleeve 43. (In Fig. 6 this gear is shown covered by a releaser cone 52, the pawl 50 being held thereby out of engagement with gear 51). By means hereinafter described, when the platen carriage is returned releaser cone 52 is first moved to the left of Fig. 6, so as to permit pawl 50 to engage with gear 51, so that the return movement of the rack bar 45 is communicated through gear 51 and pawl 50 to disk 49, shaft 36 and disk 39, so winding up springs 38. Spring casing 37 is held stationary, normally, by engagement of gear teeth 53 formed on its periphery with a pinion 54, said pinion normally held against rotation by a catch 55 dropped between two of its teeth. Said pinion further carries a non-return pawl 54$^a$ engaging a ratchet-wheel 54$^b$ secured to fixed stud 54$^c$, which pawl prevents accidental unwinding of spring 38 if catch 55 be lifted. This catch 55, and pinion 54, constitute convenient means for adjusting the initial tension of spring 38. Except for such adjustment, they do not require manipulation during the operation of the machine.

Upon shaft 36, and keyed thereto, is a ratchet wheel 56; and a pawl 57 carried by disk 58 keyed to sleeve 40, is normally in engagement said ratchet wheel 56, so serving to drive escapement wheel 41 when shaft 36 rotates forward. During backward rotation of shaft 36 (return of the carriage) pawl 57 of course slips over ratchet wheel 56. Sleeve 43 has a similar ratchet-wheel, 62, normally engaged by a pawl 61 carried by disk 60 keyed to sleeve 59, to which sleeve escapement wheel 42 is keyed. Upon sleeve 43 is mounted a sliding pawl-releaser, 63, having the releasing cone 52 already mentioned and having also a further releaser cone 64 adapted to engage pawls 61 and 57 and lift same out of engagement with pinions 56 and 62 respectively. In Figs. 21 and 22 I show one of these pawls, 57, in detail; and pawls 50 and 61 are similar, in that all three pawls have a rounded edge adapted to be engaged by the corresponding releaser cone, 52 or 64, so as to lift the pawl from engagement with the gear teeth.

Pawl releaser 43 is arranged to be shifted, automatically, as a preliminary to returning the carriage. To this end, pivoted arms 65 (Figs. 2 and 6) are provided, said arms being pivoted to transverse shaft 66. The platen carriage is provided, adjacent to the platen, with a carriage-return lever 67 (Figs. 1, 2 and 17) mounted on a vertical shaft 68 (Figs. 2, 6 and 17) having on it a cam 69 arranged to act on a rod 70 connecting arms 65. These arms are further connected by a transverse rod 71 engaging the pawl-releaser 63 and serving as a means for moving the latter back and forth. A stop screw 72 (Fig. 17) limits the motion of lever 67.

In pressing upon lever 67 to return the carriage, the first effect of the pressure is to rotate shaft 68 slightly so as to shift pawl-releaser 63, disengaging pawl 61 from pinion 62, and permitting pawl 50 to engage pinion 51; and further pressure on the lever then returns the carriage, winding up the springs 38 and 47 but not affecting the escapement wheels 41 and 42. As soon as lever 67 is released, the carriage having been returned as far as desired, a spring 73 (Figs. 2 and 6) returns arms 65, rod 70, and pawl releaser 43, also lever 67, to normal. To release the carriage so as to permit it to be moved freely to the left, a lever 74 is provided (Figs. 1, 2 and 17). This lever is also mounted on shaft 68, but its stop screw 75 (Fig. 17) permits somewhat greater movement of shaft 68 than is permitted lever 67. Lever 74, when pressed as far as it will go, causes cam 69 to move arms 65 and rod 71 and sleeve 43 so far to the left (of Fig. 6) that pawl 57 as well as pawl 61 is disengaged from gear teeth 86, thus entirely disengaging the carriage from shaft 36 and the escapements. The carriage may then be moved forward and back by hand without regard to the escapement mechanism.

Ratchet wheel 42, driven by spring 47, as previously shown, operates the printing hammer 75 (see particularly Figs. 3, 4, 13, 14, 15 and 27). This hammer is a substantially vertical extension of a bell-crank lever 76 pivoted at 77 and having a depending arm 78 to which a spring 79 is connected, said spring tending to move the hammer rapidly toward the type pins or plungers 80 in typewheel 23. Such movement of the hammer is normally restrained by engagement of a pawl 81 (Figs. 2 and 15) with a tooth of ratchet wheel 42; said pawl being carried by a lever 82 (Figs. 4, 15 and 23) pivoted at 83 to said hammer, and pivotally mounted on sleeve 59; the spring 79 being thereby prevented from operating hammer 75 except when pawl 81 releases wheel 42, as hereinafter described. This pawl 81 is connected by a pin 84 working in a slot 85 in said pawl, with another pawl or tooth-catcher 86, which has the form of a bell-crank lever, one arm of the bell-crank carrying the pin 84 and the other arm provided with a tooth 87 adapted to engage the teeth of escapement wheel 42. This bell crank pawl 86 is pivoted at 88 and is provided with a rearward extension 89, by which the escapement comprising wheel 42 and pawls 81 and 86 is caused to operate, as hereinafter described.

Adjacent to ratchet wheel 41 is a lever 90, pivotally mounted on sleeve 40, and carrying a pivoted pawl 91 adapted to engage the teeth of ratchet wheel 41. A tooth catcher, 92, is also provided for ratchet wheel 41, said tooth catcher having the form of a bell-crank lever, one arm of which has a pin 93 working in a slot 94 of pawl 91. This tooth-catcher is pivoted at 95, and is provided with a rearward extension 96 having a tooth 97 adapted to be engaged by a pawl 98 pivoted to a lever 99 (Fig. 4) which lever is actuated, as hereinafter described, by the main actuating bar of the escapement mechanism; which actuating bar is in turn actuated by the depression of the various finger keys. The escapement comprising wheel 41 and pawls 91 and 92 is started in operation by the disengagement of pawl 98 from tooth 97—such disengagement being accomplished in a manner hereinafter described—and when such disengagement occurs the rearward extension 96 of tooth catcher 92 drops down until its end rests on an adjustment screw 100 carried by a rearward extension 82ª of lever 82; such motion of the tooth catcher moving its tooth 101 into position to arrest ratchet wheel 41 after rotation thereof through about half the space of one of its teeth, and moving pawl 91 out of engagement with ratchet wheel 41, so permitting operation thereof by spring 38. Lever 90 is pivoted at 102 to a restorer 103, (Figs. 3, 4, 5, 15 and 26), itself carried by a lever 104 pivoted at 105 to a stationary portion of the machine and carrying, at a point in rear of said pivot, an adjustment screw 106 adapted to engage the previously mentioned rearward extension 89 of tooth catcher 86. As soon as pawl 91 is disengaged from ratchet wheel 41, as previously described, spring 107 (Fig. 4) raises lever 104 and moves the restorer forward the screw 106 being caused to push down the rearward extension 89 of tooth catcher 86, moving the tooth 87 into position to arrest ratchet wheel 42 after motion thereof through about half the space of one of its teeth, and at the same time moving pawl 81 out of engagement with ratchet wheel 42, so permitting said wheel to be operated by spring 47. Spring 79 (Figs. 4 and 5) then causes hammer 75 to move toward the platen; and as it so moves the rearward extension 82ª (see Figs. 4, 5, 15 and 23) of hammer lever 82 engages the rearward extension 96 of tooth catcher 92 and moves said tooth catcher out of engagement with ratchet wheel 41, moving pawl 91 into engagement with a tooth of said ratchet wheel; and said ratchet wheel, being driven by spring 38, carries down pawl 91, lever 90, and restorer 103, until a stop screw 108 (Figs. 4, 10 and 15) carried by a stationary portion of the machine engages lever 90 and arrests its movement and that of wheel 41; wheel 41 having then rotated through the space of one tooth from the position occupied when pawl 98 was first actuated. Screw 106 at the rear end of lever 104 having been raised by the return of restorer 103, the pressure of spring 47, acting through wheel 42 on tooth catcher 86, moves pawl 81 into engagement with wheel 42, and so draws back hammer 75; the parts being then in normal position.

It will be observed that when tooth 97 is released, the escapement mechanism of wheel 41 operates and in turn starts the escapement mechanism of wheel 42, which latter mechanism then causes the mechanism of wheel 41 to return to normal, and this mechanism of wheel 41 then causes that of wheel 42 to return to normal. In other words, each escapement mechanism sets the other in operation. So long as pawl 98 does not engage tooth 97 and prevent lever 96 from dropping, the two escapement mechanisms will continue to operate each other as described, the hammer 75 and restorer 103 being moved forward and back and the platen carriage being fed forward space by space (owing to rotation of pinion 44). If a single character is to be printed, pawl 98 will arrest lever 96 after one operation of the escapement mechanisms; but if a word is to be printed, pawl 98 will arrest lever 96 only after the last letter of the word has been printed.

*Finger keys and mechanism operated thereby.* (Figs. 1, 3, 4, and 10–14 incl.)— The key-lever, 110, of spacing key 26, is at the center of the key-board. The other key-levers are arranged part on one side of the spacing key-lever and part on the other side, in what may be termed, for convenience, right-hand and left-hand groups, respectively.

For operating the escapement mechanism when any one of the character-keys is depressed, there are two curved levers, 111 and 112, the former over the left-hand key-levers, the latter over the right-hand key-levers. These levers are secured, respectively, to a left-hand sleeve 113 and a right-hand sleeve 114 (Figs. 10, 11 and 12), said sleeves mounted to turn freely on transverse rock-shafts 115 and 116 respectively, which rock-shafts are themselves mounted in bearings in fixed portions of the frame of the machine, and are arranged to be oscillated by means hereinafter described, and for purposes hereafter apparent. When one of the character keys is depressed, the corresponding curved lever, 111 or 112, will be raised, so turning the corresponding sleeve, 113 or 114. On left-hand sleeve, 113, is fixed a lever 117, (Figs. 4, 10, 11, 12 and 29), of peculiar shape, one end carrying a spring-actuated dog 118 adapted to engage a bar 126, which is the actuating member of the escapement mechanism previously described, the other end carrying a pin 119 normally engaged by a dog 165 of one of the two typewheel-turning levers 144 and 145, hereinafter mentioned. On right-hand sleeve 114 is fixed a similar lever, 120 (Figs. 3, 10, 11 and 12) likewise carrying a spring-actuated dog, 121, adapted to engage bar 126, and likewise provided at its other end with a pin, 122, normally engaged by a dog 166 of the other typewheel-turning lever. Obviously when one of the character keys is depressed and its corresponding escapement lever, 111 or 112, is raised, lever 117 or 120, as the case may be, is caused to depress bar 126 (so disengaging pawl 98 from tooth 97—Fig. 15—as will be seen hereafter), and at the same time to disengage its pin, 119 or 122, as the case may be, from the dog of the typewheel-turning lever, so permitting that lever to operate. Shaft 115 has keyed to it a lever 123 (Fig. 30) having a hook-shaped upper end 125, engaging and adapted to depress bar 126; and shaft 116 has keyed to it a corresponding lever 124 likewise provided with a hook-shaped head 125 adapted to engage bar 126. Shaft 115 is arranged to be rocked by the depression of long-space key 31, the key-lever 130 of said key (which key-lever, like the various character-levers, is fulcrumed on a comb 131) being adapted to engage a lever 132 keyed to shaft 115. It is clear that when key 31 is depressed bar 126 will be depressed and will remain so so long as key 31 is held down. Similarly, shaft 116 is arranged to be rocked by the depression of word-shift keys 29 and 30, the key-levers, 133 and 134, of said keys, engaging levers, 136 and 137, respectively, on shaft 116; so that when one of these shift-keys is depressed lever 124 is caused to depress bar 126 of the escapement mechanism.

The two upper rows of character keys have key-levers which extend farther toward the rear of the machine than do the levers of the three lower rows of character keys, and are arranged to actuate one or the other of two levers, 138 and 139, (Figs. 12, 13 and 14, 36 and 37) carried by a rock shaft 140, which shaft has secured to it an arm 141, carrying a spring-actuated dog 142 adapted to engage a pin 143 carried by arm 124 above mentioned. It is clear that when one of the keys of these two upper rows is depressed shaft 140 will be rotated, and dog 142 will draw down arm 124, so drawing down bar 126; a pawl 183, hereinafter mentioned, (see Figs. 13, 14 36 and 37) then catching on a pin 184 (Figs. 13, 14 and 32), so holding bar 26 down until said pawl is released after the printing of the last character of the word, by the action of a suitable trip 180, hereinafter mentioned. Shaft 140 has loosely mounted upon it, left-hand and right-hand typewheel-turning arms, 144 and 145, actuated as hereinafter described, for rotating the typewheel to bring the desired row of type into printing position.

The space-lever, 110, engages a lever 146

(Figs. 10, 11, 12 and 31) pivoted on shaft 115; said lever 146 having a spring-actuated pawl, 147, adapted to engage escapement actuating bar 126.

The levers of shift-keys 27, 28, 29 and 30 are mounted on transverse rock-shaft 148, which shaft has secured to it an arm 149, which controls the axial movement of the typewheel, as explained hereafter.

*Typewheel and operating mechanism thereof.*—The typewheel or type cylinder, 23, is mounted, as previously stated, on spindle or shaft 24, and carries a large number of type plungers or pins, 150, (Fig. 3), each arranged to slide radially in a suitable bearing in the typewheel, when struck by the hammer 75. Each such pin has a retractile spring 151. Spindle 24 does not revolve, but may be moved longitudinally for "shifting," as hereinafter described; and the typewheel turns upon this spindle as a journal. I have shown said typewheel as provided with a ball step-bearing, 152, though any other bearing suitable for the purpose may be employed instead. For raising the typewheel step by step, in word-printing and the like, the spindle 24 is provided, at its lower end, with a toothed rack, 153; and a pinion 154 on a sleeve 155, (Fig. 13) engages said rack. This sleeve 155 is mounted on a shaft 156 which has keyed to it a gear wheel 157 meshing with a gear wheel 158 (Figs. 6, 10 and 5) keyed to sleeve 59 (Fig. 6) of the escapement mechanism; which sleeve is driven from spring 47 through pawl 61 and is controlled by escapement wheel 42 and pawls 81 and 87, all as previously explained. A ratchet wheel 159 is keyed to sleeve 155, and is adapted to be engaged by a pawl 160 carried by a disk 161 keyed to shaft 156. A pawl releaser 162 is mounted to slide on sleeve 155, and is arranged to be moved back and forth by a bell-crank extension 163 of arm 124 on shaft 116. In the normal position of said pawl-releaser (which is the position shown in Fig. 13), the pawl 160 is held away from ratchet wheel 159; while in the opposite position of said pawl-releaser (shown in Fig. 14) the pawl 160 is in engagement with said ratchet wheel 159. With the parts in this latter position (one of the keys of the two upper rows will effect movement of pawl releaser 162 to the position shown in Fig. 14, and so will depression of either of shift-keys 29 and 30), rotation of the sleeve 59, such as accompanies operation of the hammer 75 and the step-by-step movement to the left of rack-bar 45 and the platen carriage, will obviously cause pinion 154 to rotate and raise spindle 24 and typewheel 23, step by step, between operations of the hammer 75. A spring 164 on sleeve 155 tends to hold the pawl-releaser 162 in the position shown in Fig. 13. Rotation of the typewheel to bring the desired row of type into printing position is effected as follows: Depression of one of the character-keys raises one of the two levers 111 and 112 (111 for example) and so rotates one of the two sleeves 113 and 114 (113 for example) so oscillating one of the two arms 117 and 120 (117 for example) in such manner as to raise its pin, 119 or 122, (119 for example), out of engagement with a dog, 165, or 166, carried by the corresponding typewheel-turning arm, 144 or 145, previously mentioned, which dog has hitherto held said arm back against the tension of a spring, 167 (Fig. 4) or 168 (Fig. 3). The said arm, 144 or 145, being so released, is actuated by its spring, and a pin 169 or 171 at its top presses against a radial arm 170 or 172 (Figs. 1 and 35) of a three-armed spider, in driving connection with the typewheel, so causing said arm and the typewheel to rotate. Said spider is connected to the typewheel by means of pins 174 fitting into corresponding sockets in the typewheel. The third arm of the spider, 173, travels over the top of a series of stop pins, 175 (Figs. 1, 3, 4, 11, 12 and 37), each pin located above a corresponding character lever and arranged to be raised thereby when the corresponding character key is depressed. Springs 176 normally hold these stop-pins down. When the spider and typewheel are rotated, as described, the rotation continues until arm 173 of the spider encounters that stop pin 175 which has been elevated; the typewheel being thereby arrested with the row of type-plungers corresponding to that key which has been actuated, in printing position. The same motion of arm 117 or 120 which starts the rotation of the typewheel, as described, also draws bar 126 of the escapement mechanism down, so causing hammer 75 and restoring-lever 103 to operate. In its backward motion, after the hammer 75 has struck, a transverse pin 117 carried by the restoring-lever 103 draws back the typewheel-turning arm, 144 or 145, which has operated, said arm in turn drawing back the typewheel by engagement of the parts 169 or 171, of said arm with one of two notches in the arm 173 (Fig. 35) and the dog, 165 or 166, of that typewheel-turning arm will engage the corresponding pin, 119 or 122, being thereby held back until released by the depression of another key lever.

It has been explained that in word-printing, the typewheel is raised step-by-step by the action of the escapement mechanism, the hammer 75 operating between steps, until the action of the escapement mechanism is arrested by engagement of pawl 98 with tooth 97. Such engagement is effected as follows: Hammer 75 has pivoted to it a trigger, 180, arranged to move forward and back with the hammer, and, when said hammer moves forward to strike a type-pin on the lowermost row of the typewheel, this trigger encounters a pin 181 on the bottom of the typewheel, and is pressed back thereby with respect to the hammer. Arm 124 has a downward extension, 182, having upon it a spring-pressed dog, 183, which, when said arm 124 is depressed, engages a pin 184 carried by a trip 185 pivoted to a fixed support 186 (Figs. 3, 11 and 32), so holding down arm 124 and the operating member 126 of the escapement mechanism until trigger 180 is pressed back, as already described, whereupon a pin 187 carried by said trigger engages trip 185 and moves it, against the action of its spring 189, (Figs. 3 and 32), until its pin 184 is moved out of engagement with dog 183, whereupon arm 124 and the member 126 of the escapement mechanism are raised by a spring 188 connected to one of the arms 127 which carry member 126. This has the effect of causing pawl 98 to engage tooth 97, so stopping the action of the escapement mechanism. When printing single characters, i. e., when spelling out words in the usual manner, and the like, there is no occasion for any such action of the trigger 180, since the depression of one of the three lower rows of keys of the keyboard does not cause the operation of either of arms 124 and 141, member 126 being depressed by one or the other of arms 117 and 120, but not being locked down, so that pawl 98 engages tooth 97 after one operation of the hammer. The lower-case characters are all in the top row of the typewheel. When an upper-case character is to be printed, the shift key 27 is first depressed, which has the effect of raising the typewheel so as to bring its second row of type opposite the hammer; and as soon as this shift key is released the typewheel drops back to its first position. When a numeral or the like is to be printed, the shift key 28 is first depressed, which has the effect of raising the typewheel so as to bring its last row of type opposite the hammer; and as soon as this shift key is released the typewheel drops back to first position. Depressing word-printing shift keys 29 and 30 not only raises the typewheel but depresses lever 124, which lever is the same lever which is depressed, through the action of lever 141, dog 142, and pin 143, (Figs. 13 and 14), when one of the keys of the two upper rows is depressed, as previously explained; and when lever 124 is so depressed, it carries down with it bar 126, and it is held down by pawl 183 engaging pin 184, all as previously explained. These shift keys 29 and 30 are pivotally mounted on transverse rock-shaft 148, and as shown in Fig. 18, which is a detail view of one of said key-levers (and what is true of one is true of the other), each said key-lever has in its hub a slot 178 in which travels a pin 179 projecting from rock-shaft 148; the connection of the levers to said shaft being such, therefore, that when one of said levers is depressed and, acting on its pin 179, causes the rock shaft to rotate, the other shift lever is not moved. The other two shift keys, 27 and 28, are connected to the rock shaft 148 in the same manner. It will be seen, therefore, that when one of the four shift keys is depressed, shaft 148 is rotated, but none of the other shift keys are operated. Owing to the different lengths of the several shift key levers, and to regulation of range of possible movement of said lever, each lever when depressed, moves the rock shaft 148 through a different angle, so causing arm 149 on said shaft to raise the typewheel to a different height, corresponding to a different row of type on the typewheel.

Levers 29 and 30, besides raising the typewheel, have rearward extensions, numbered 133 and 134, respectively, which engage arms 136 and 137, respectively, on rock shaft 116, which is the rock shaft on which arm 124 is mounted; so that when one of said shift levers is depressed, it actuates, not only the means for shifting the typewheel, but also the rock shaft 116 and 124, causing transverse bar 126 of the escapement mechanism to be depressed and locked down by pawl 183 (Fig. 13), so that the escapement mechanism will continue to operate the hammer 75 and typewheel-raising mechanism, step-by-step, until the trigger 180 is operated when a pin 181 of the typewheel is reached, so releasing lever 124 and bar 126 and stopping the operation of the escapement mechanism. When a word requires only a few of the characters in a vertical row of the type wheel, a pin 181 is located below the last character. Owing to arms 136 and 137 being of different length, and rearward extensions 133 and 134 being also of different length, either of key levers 29 and 30 moves the shaft 116 the same distance as the other, notwithstanding that said keys are arranged to be depressed through different distances. Lever 27, the "upper case" lever, when operated raises the typewheel to bring the second row of type into printing position. This key is used in connection with the three lower rows of keys, in the arrangement of keys shown in Fig. 1. Lever 30, when depressed, raises the typewheel two spaces, and is used for printing words of four letters or less in the three lower rows of the keyboard. Words such as "where" and "these", consisting of five letters, if their corresponding keys are located in one of the three lower rows, as shown, are printed by first depressing said key, releasing it, then depressing the shift key 30, and then depressing the word key again. In the case of keys of the two upper rows corresponding to two words, the first or upper-row word is printed by depressing the corresponding key; a suitable stop pin 181 located just below the last type of that word stopping the printing as soon as the last letter of that word has been printed. The other or lower-row is printed by first depressing shift-key 29, so raising the typewheel until the horizontal row of type in which the first letter of the word is located, is in printing position, and then depressing the word key.

For moving the carriage quickly several spaces to the left, as when making long spaces between words or sentences, the key 31 is depressed, so raising arm 132, on shaft 115, and causing arm 123 on that shaft to depress escapement bar 126, whereupon the escapement mechanism operates, feeding the carriage to the left step by step, so long as the key 31 is held down, or until the end of the line is reached. So, a character may be repeated many times, by first depressing the corresponding character key, so rotating the type wheel to the proper position to print that character, and then depressing key 31. In this way, by first depressing the hyphen or the underscore key, and then key 31, a line may be drawn.

It will be understood that when the typewheel is in normal position no type are opposite the hammer, so that operation of the escapement mechanism, including the hammer, with the type wheel in this position (as when space key 26 or 31 is depressed, the latter by itself), prints no impression on the paper. When the space key, 26, is depressed, its lever 110 actuates arm 146 on shaft 115, and the dog 147 on said arm then draws down bar 126 of the escapement mechanism, so causing the operation of the escapement mechanism once for each depression of the space key; but operation of arm 146 does not release either of the two typewheel-turning arms, 144 and 145, and so does not cause rotation of the typewheel; hence the operation of the escapement mechanism through the depression of space key 25 effects only the feeding of the carriage, the hammer moving idly.

*Platen, carriage etc.*—The platen carriage comprises side frames, 200, connected by rods 201 and 202, the former carried by bearing rollers 203, the latter by bearing rollers 204. The platen, 22, is not used for feeding the paper, but serves merely as a backing for the paper; consequently it may be flat-sided, and I have shown it as hexagonal in section. When one side of the platen has become irregular from use, the platen may be turned so as to bring another side into use. Below the platen there is a feeding roller, 205, against which the paper is pressed by pressure-rollers 206 carried by a swinging support comprising a shaft 207 and arms 208, pivoted by a rod 209 (Figs. 2 and 3) to the side frames 200. A spiral spring 210 (Fig. 2) tends to press these pressure-rollers against feeding roller 205. For relieving this pressure when so desired, a hand-lever 211, (Figs. 1, 2 and 4) is provided, said lever being pivoted to the side of the carriage and arranged when depressed to force out shaft 207. As previously explained, the carriage has secured to it the rackbar 45, in mesh with gear 46, so that as the escapement mechanism operates the carriage is moved step by step to the left, by spring 47. For returning the carriage and at the same time feeding the paper upward, I have provided a handlever 212 (Figs. 2, 4, 33 and 34). This lever 212 is a bell-crank lever, arranged to move a rotary cam 213 until a tooth 214 on said cam encounters a stop 215. This cam 213 carries a pawl 216, and when, during return movement of lever 212 and cam 213, due to spring 217 (Fig. 34), this pawl engages a ratchet 218 on feed-roller 205, the feed roller is caused to rotate, so feeding the paper. This distance the paper is fed may be regulated by regulating the position of stop 215; and for this purpose a series of holes are provided in the adjacent frame-plate 21, said stop 215 being a spring arm having at its end a point adapted to be seated in one or another of said holes at will, so regulating the distance to which cam 213 can be moved.

Any suitable ribbon feed mechanism may be employed. I have illustrated, as a conventional illustration of ribbon feed mechanism, a mechanism comprising a shaft 219, Figs. 3, 4 and 5, having on it a ratchet wheel 220, arranged to be moved step by step by a pawl 221 on the restoring lever 104, said shaft driving one or the other of the two ribbon reels, 32 and 33, at will, through suitable gearing, as shown; and by pushing shaft 219 to one side or the other, it may be caused to drive one or the other of said reels.

For regulating the tension of the spring 79 of the hammer 75, I have shown a shaft 222, Fig. 5, arranged to be rotated by hand, and driving, through worm gearing 223—224, a pivoted arm 225, to which one end of the spring is secured. It will be seen that the rotation of shaft 222 will cause arm 225 to move slightly, one way or the other, so altering the tension of spring 79. The worm gearing being self-locking, as such gears commonly are, no separate locking device is required to lock the arm 225, once the latter has been adjusted as desired.

In case it be thought undesirable to lift the entire typewheel step by step, in word printing and the like, the type wheel may be formed of a plurality of sectors or segments, only one of which need be lifted in word-printing. This is illustrated in Figs. 38, 39, and 40, which show a typewheel composed of a number of segments, 226, mounted for rotation on the shaft 227, but adapted to be raised separately. According to this construction, the shaft 227 is not lifted in the shifting, but instead it has mounted upon it a sleeve 228, carrying an off-set pusher 229, adapted to raise whichever one of the segments is over it, whenever said pusher is raised. Sleeve 228 is arranged to be raised either by the arm 149, operated by the shift-keys, or by the pinion 154 operated by the step-by-step mechanism previously explained with reference to Figs. 13 and 14. But while the segments 226 may be raised separately, and so reduce materially the work required to be done to shift the typewheel in printing words automatically, they all rotate together, and so are moved rotatively by the same mechanism as previously explained for that purpose, and in the same way.

What I claim is:—

1. A typewriter comprising a type carrier having thereon a plurality of type characters arranged in permanent word groups, and automatic key-controlled means arranged to print successively and in order from the characters of any selected word group.

2. A typewriter comprising a type carrier having thereon a plurality of type characters arranged in permanent word groups, a plurality of word keys, each corresponding to one of said word groups, and automatic means controlled by said keys and arranged to print successively and in order from the characters of any word group corresponding to any one of said keys which may be actuated.

3. A typewriter comprising a plurality of type arranged in word-groups, the type of each such group arranged in a row, and automatic word-printing means arranged to print automatically and successively from the different type of a selected word-group.

4. A typewriter comprising a plurality of type arranged in permanent word-groups and automatic word-printing means arranged to print successively and automatically from the type of different word-groups, and determining means determining the word-group to be printed from.

5. A typewriter comprising a type carrier having a plurality of type arranged in different word-groups, key-controlled determining means determining the group to be printed from, and automatic printing means arranged to print automatically and successively from the several type of each group so determined.

6. A typewriter comprising a single mechanism, a plurality of type, one or more keys, corresponding each to a predetermined plurality of said type, and automatic mechanism controlled by said keys arranged to print successively from such type in the predetermined order corresponding to any particular one of said keys which may be actuated.

7. A typewriter comprising in a single mechanism, a plurality of type, one or more keys, corresponding each to a predetermined plurality of said type, automatic power-actuated mechanism arranged to print successively from such type in predetermined order, corresponding to any particular one of said keys which may be actuated.

8. A typewriter comprising a plurality of type arranged in a plurality of permanent word-groups, automatic mechanism arranged to print successively from the type of each word-group, and key-controlled determining means for selecting the word-group to be printed from.

9. A typewriter comprising a type carrier having a plurality of type arranged in different word-groups, determining means arranged to bring one or another of said word-groups opposite a printing position, and automatic printing means arranged to print automatically and successively from the several type of each group so determined.

10. A typewriter comprising a type carrier having a plurality of type arranged in different word-groups, determining means arranged to bring one or another of said word-groups opposite a printing position, and automatic printing means comprising means arranged to move the carrier to bring the different type of a group so determined into printing position successively, and means for printing from the several type successively as so positioned.

11. A typewriter comprising a rotary type carrier having a plurality of type arranged in different word-groups in rows parallel with the axis, determining means arranged to rotate said carrier to bring one or another of said rows into printing position, and automatic printing means comprising means arranged to move the carrier axially to bring the different type of a group so determined into printing position successively, and means for printing from the several type successively as so positioned.

12. A typewriter comprising a rotary carrier having a plurality of type arranged in different word-groups in rows parallel with the axis, determining means arranged to rotate said carrier to bring one or another of said rows into printing position, and automatic printing means comprising means arranged to move the carrier axially to bring the different type of a group so determined into printing position successively, and an automatically operated hammer arranged to coact with each type so positioned to produce an impression.

13. A typewriter comprising a rotary type carrier having a plurality of type arranged in different word-groups in rows parallel with the axis, determining means arranged to rotate said carrier to bring one or another of said rows into printing position, and automatic printing means comprising means arranged to move the carrier axially to bring the different type of a group so determined into printing position successively, an automatically operated hammer arranged to coact with each type so positioned to produce an impression and power-operated escapement mechanism arranged to move said carrier and operate said hammer alternately.

14. A typewriter comprising a type carrier provided with type arranged in a plurality of rows in two different directions, determining means for moving said carrier in one of said directions to different selected positions, automatic means arranged to move said carrier in the other of said directions, and printing means arranged to cause impressions to be made as said type reach a printing position during the latter of said movements.

15. A typewriter comprising a type carrier provided with type arranged in a plurality of rows in two different directions, determining means for moving said carrier in one of said directions to different selected positions, automatic means arranged to move said carrier step by step in the other of said directions, and printing means arranged to operate during intervals of rest between steps and to cause impressions to be made as said type reach a printing position during the latter of said movements.

16. A typewriter comprising a type carrier provided with type arranged in a plurality of rows in two different directions, determining means for moving said carrier in one of said directions to different selected positions, automatic means arranged to move said carrier step by step in the other of said directions, and printing means arranged to cause impressions to be made as said type reach a printing position during the latter of said movements.

17. A typewriter comprising a type carrier mounted to move around an axis of rotation and provided with type arranged in a plurality of rows in the direction of rotation and in the axial direction, determining means for rotating said carrier to different selected positions, automatic means arranged to move said carrier axially, and printing means arranged to cause impressions to be made as the type reach a printing position during such axial movement.

18. A typewriter comprising a type carrier mounted to move around an axis of rotation and provided with type arranged in a plurality of rows in the direction of rotation and in the axial direction, determining means for rotating said carrier to different selected positions, automatic means arranged to move said carrier step by step axially, and printing means arranged to cause impressions to be made as the type reach a printing position during such axial movement.

19. A typewriter comprising a type carrier mounted to move around an axis of rotation and provided with type arranged in a plurality of rows in the direction of rotation and in the axial direction, determining means for rotating said carrier to different selected positions, automatic means arranged to move said carrier step by step axially, and printing means arranged to operate during intervals between steps and to cause impressions to be made as the type reach a printing position during such axial movement.

20. A typewriter comprising a type carrier provided with type arranged in a plurality of rows in two different directions, determining means for moving said carrier in one of said directions to different selected positions, printing means, and escapement mechanism arranged to move said carrier in the other of said directions, and to operate said printing means, alternately.

21. A typewriter comprising a type carrier mounted to move around an axis of rotation and provided with type arranged in a plurality of rows in the direction of rotation and in the axial direction, determining means for rotating said carrier to different selected positions, printing means, and escapement mechanism arranged to move said carrier axially, and to operate said printing means, alternately.

22. A typewriter comprising a type carrier provided with type arranged in a plurality of rows in two different directions, determining means for moving said carrier in one of said directions to different selected positions, printing means, and power operated escapement mechanism arranged to move said carrier in the other of said directions, and to operate said printing means, alternately.

23. A typewriter comprising a type carrier mounted to move around an axis of rotation and provided with type arranged in a plurality of rows in the direction of rotation and in the axial direction, determining means for rotating said carrier to different selected positions, printing means and power operated escapement mechanism arranged to move said carrier axially, and to operate said printing means, alternately.

24. A typewriter comprising a record support, a type carrier having a plurality of type arranged in different word-groups, determining means determining the group to be printed from, automatic printing means arranged to print automatically and successively from the several type of each group so determined, and means for producing relative movement between said record support and type, for letter spacing.

25. A typewriter comprising a record support, automatic word-printing means arranged to print the several letters of words automatically and successively, and comprising type characters arranged in a plurality of permanent word groups and means for determining one or another of said word groups to be printed from, and means for producing relative movement between said record support and word-printing means, for letter spacing.

26. A typewriter comprising a record support, automatic word-printing means arranged to print the several letters of words automatically and successively, means for producing relative movement between said record support and word-printing means, for letter spacing, and power-storing driving means for said word-printing means, operated by restoration of original relative positions of said record support and word-printing means.

27. A typewriter comprising a record support, automatic word-printing means arranged to print the several letters of words automatically and successively, means for advancing the record support following the printing of each character, for letter spacing, and power-storing driving means for said word-printing means operated by return of said record support.

28. A typewriter comprising in combination character determining means including power-actuated driving means, power-actuated printing means, separate escapement devices for said character-determining means and printing means, and means for releasing one of said escapement devices at will, said escapement device so arranged to be released comprising means for releasing the other escapement device.

29. A typewriter comprising in combination character determining means including power-actuated driving means, an escapement therefor, power-actuated printing means, a controlling escapement therefor, and means for releasing the former of said escapements, the escapement arranged to be so released comprising means for releasing the other escapement.

30. A typewriter comprising in combination coacting escapements controlling different mechanisms, one such escapement comprising means controlling the other escapement and the operation of the means controlled thereby.

31. A typewriter comprising in combination coacting escapements controlling different mechanisms, each such escapement comprising means for releasing the other, and means for starting and stopping the operation of said escapements.

32. A typewriter comprising in combination a type carrier, printing means, a record carrier, an escapement controlling the operation of said printing means and movement of said record carrier for letter spacing, another escapement controlling movement of said type carrier, and power means operating through said escapements, one said escapement comprising means adapted to release the other escapement.

33. A typewriter comprising in combination a type carrier, printing means, a record carrier, an escapement controlling the operation of said printing means and movement of said record carrier for letter spacing, another escapement controlling movement of said type carrier, and power means operating through said escapements, each escapement comprising means adapted to release the other escapement.

34. A typewriter comprising in combination a type carrier, printing means, a record carrier, an escapement controlling the operation of said printing means and movement of said record carrier for letter spacing, a second escapement controlling movement of said type carrier, power means operating through said escapements, each escapement comprising means adapted to release the other escapement, and key-controlled means for starting and stopping the operation of said second escapement.

35. A typewriter comprising in combination a type carrier, printing means, a record carrier, power-storing means for operating said printing means, record carrier and type carrier, an escapement controlling the operation of said printing means and record carrier, another escapement controlling movement of said type carrier, said latter escapement arranged to release said first escapement, said power-storing means operated by restoration of said record carrier to store power for further operation.

36. A typewriter comprising in combination a type carrier, printing means, a record carrier, power-storing means for operating said printing means, an escapement controlling the operation of said printing means, record carrier, and type carrier, another escapement controlling movement of said type carrier, said latter escapement arranged to release said first escapement, said power-storing means operated by return of said record carrier to store power for further operation.

37. A typewriter comprising in combination a movable carriage, printing means, spring means for moving said carriage in one direction and for operating said printing means to do the work of printing by power, escapement means controlling movement of the carriage and operation of said printing means, such spring means arranged to be wound by return of the carriage, determining means for determining the character to be printed, comprising spring operating means and escapement means controlling same, said latter spring means arranged also to be rewound by return of the carriage.

38. A typewriter comprising in combination a movable carriage, printing means, spring means for moving said carriage in one direction and for operating said printing means to do the work of printing by power, escapement means controlling movement of the carriage and operation of said printing means, such spring means arranged to be wound by return of the carriage, determining means for determining the character to be printed, comprising spring operating means and escapement means controlling same, said latter spring means arranged also to be rewound by return of the carriage, said latter escapement means arranged to release said former escapement means.

39. A typewriter comprising in combination, a carriage, type, a hammer, determining means arranged to determine the character to be printed, and mechanism including a spring arranged to be wound by the return of the carriage and an escapement controlling transmission of power from said spring, for operating said hammer, said determining mechanism comprising other spring operated mechanism arranged to be rewound by return of the carriage and comprising also an escapement controlling said latter spring operated mechanism, said latter escapement arranged when operated to release said first escapement.

40. A typewriter comprising in combination a movable carriage, printing mechanism, type, determining means for determining the character to be printed, power storing means for doing the work of printing, for feeding the carriage and for operating said determining means, escapement mechanism controlling said power storing means, such escapement mechanism including clutches, and carriage return means arranged to open such clutches during return of the carriage.

41. A typewriter comprising in combination a movable carriage, printing mechanism, type, determining means for determining the character to be printed, power storing means for doing the work of printing, for feeding the carriage and for operating said determining means, escapement mechanism controlling said power storing means, such escapement mechanism including clutches, and carriage release means adapted to open such clutches to free the carriage.

42. A typewriter escapement mechanism comprising a spring, a driving shaft in driving connection with one end of such spring, a sleeve thereon and a clutch adapted to connect such sleeve to the opposite end of such spring, for rewinding another spring in driving connection with such sleeve, and two escapement devices, one controlling spring-produced motion of said shaft, the other controlling spring-produced motion of said sleeve.

43. A typewriter escapement mechanism comprising a spring, a driving shaft in driving connection with one end of such spring, a sleeve thereon and a clutch adapted to connect such sleeve to the opposite end of such spring, for rewinding another spring in driving connection with such sleeve, two escapement devices, one controlling spring-produced motion of said shaft, the other controlling spring-produced motion of said sleeve, and means for disengaging said sleeve from said first mentioned spring.

44. A typewriter comprising a movable carriage, a spring, a shaft in driving connection with one end of said spring, a sleeve on said shaft, a clutch for connecting said sleeve to the other end of said spring for rewinding, said sleeve provided with gear teeth, a gear arranged to move with said carriage and intermeshing with such gear teeth of said sleeve, a spring motor in driving connection with said carriage, two escapement devices, one controlling spring caused rotation of said shaft, the other controlling spring caused rotation of said sleeve and carriage, and carriage return means arranged when operated to disengage said escapements from said shaft and sleeve and to engage said sleeve with said first mentioned spring for rewinding.

45. A typewriter comprising a movable carriage, a spring, a shaft in driving connection with one end of said spring, a sleeve on said shaft, a clutch for connecting said sleeve to the other end of said spring for rewinding, said sleeve provided with gear teeth, a gear arranged to move with said carriage and intermeshing with such gear teeth of said sleeve, a spring motor in driving connection with said carriage, two escapement devices, one controlling spring caused rotation of said shaft, the other controlling spring caused rotation of said sleeve and carriage, and carriage return means arranged when operated to disengage said escapements from said shaft and sleeve and to engage said sleeve with said first mentioned spring for rewinding, printing means arranged to be operated through one of said escapements and character determining means arranged to be operated through the other such escapement.

46. A typewriter comprising in combination a record-carrier, printing means, an escapement controlling the operation of said printing means and movement of said record carrier for letter spacing, power means operating through said escapement, a second escapement arranged when operated to release said first escapement, power means operating through said second escapement, and key-operated means for releasing said second escapement.

47. A typewriter comprising in combination a record-carrier, printing means, an escapement controlling the operation of said printing means and movement of said record carrier for letter spacing, power means operating through said escapement, a second escapement arranged when operated to release said first escapement, key-operated means for releasing said second escapement, and key-operated means for determining the character to be printed.

48. A typewriter comprising in combination a record-carrier, a spring means for moving said carrier in one direction, said spring means arranged to be rewound by return of said carrier, escapement mechanism controlling transmission of power from said spring means and controlling motion of the carriage under the influence of said spring means, printing means actuated by said spring means through said escapement mechanism, an oscillatory type carrier, spring-actuated means for oscillating same in one direction, restoring means comprising spring means rewound by return of the record-carrier for restoring said type carrier, and key-controlled escapement mechanism controlling transmission of power from said last-mentioned spring means and controlling operation of said restoring means, said last-mentioned escapement mechanism arranged when operated to release said first-mentioned escapement mechanism.

In testimony whereof I have signed this specification in the presence of two subscribing witnesses.

LEON HAUERSTEIN.

Witnesses:
H. M. MARBLE,
FRANK E. RAFFMAN.